United States Patent
Findley et al.

(10) Patent No.: US 8,145,646 B2
(45) Date of Patent: *Mar. 27, 2012

(54) E-MAIL RESPONSE SYSTEM

(75) Inventors: David Norman Findley, St. Louis, MO (US); Karthik Kannan, Maryville, IL (US); Srinivas Cherukuri, St. Louis, MO (US); Robert Meyer, Ballwin, MO (US); Amy Hicks, Belleville, IL (US); Benjamin E. Droney, St. Ann, MO (US); Ying Ma, Hoffman Estates, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/790,308

(22) Filed: May 28, 2010

(65) Prior Publication Data
US 2010/0241636 A1    Sep. 23, 2010

Related U.S. Application Data

(63) Continuation of application No. 11/096,204, filed on Mar. 31, 2005, now Pat. No. 7,756,878.

(51) Int. Cl.
*G06F 7/00* (2006.01)
(52) U.S. Cl. .......................... 707/748; 707/758
(58) Field of Classification Search .......... None
See application file for complete search history.

(56) References Cited

U.S. PATENT DOCUMENTS

| | | | |
|---|---|---|---|
| 6,665,395 B1 | 12/2003 | Busey et al. | |
| 6,697,858 B1 | 2/2004 | Ezerzer et al. | |
| 7,523,045 B1 * | 4/2009 | Walker et al. | 707/999.1 |
| 2002/0068558 A1 | 6/2002 | Janik | |
| 2003/0017801 A1 * | 1/2003 | Mackay | 455/3.01 |
| 2004/0162724 A1 * | 8/2004 | Hill et al. | 704/231 |
| 2006/0075037 A1 * | 4/2006 | Rothschild | 709/206 |
| 2008/0154871 A1 * | 6/2008 | Leidner et al. | 707/4 |

* cited by examiner

*Primary Examiner* — Tim T Vo
*Assistant Examiner* — Jau-Shya Meng
(74) *Attorney, Agent, or Firm* — Toler Law Group, PC

(57) ABSTRACT

A method includes receiving, at a message processing system that includes a processor and a memory, a message from an originator. The message includes content related to a particular service of a plurality of services. The method includes selecting a set of potential responses to the message at the message processing system based on the particular service. The method also includes retrieving account information related to the originator of the message at the message processing system. The method further includes filtering the set of potential responses at the message processing system to provide a filtered set of responses. The set of potential responses is filtered based on the account information. When a first response has a confidence level that exceeds a threshold confidence level, the method includes sending the first response from the message processing system to the originator of the message without sending the filtered set of responses to an agent.

20 Claims, 3 Drawing Sheets

E-MAIL RESPONSE SYSTEM

CLAIM OF PRIORITY

The present application is a continuation of and claims priority from U.S. patent application Ser. No. 11/096,204 filed on Mar. 31, 2005, the contents of which are expressly incorporated herein by reference in their entirety.

FIELD OF THE DISCLOSURE

The present disclosure relates generally to an e-mail response system.

BACKGROUND

Customers may send messages to businesses to inquire about services offered by the business and to add services or to modify services that the customers currently subscribe to. The messages may be received in a variety of formats, such as electronic mail (e-mail) or voice responses sent via an interactive voice response (IVR) system. Using live agents to answer customer inquiries may not be cost effective when at least some of the inquiries may be responded to using an automated response system.

DETAILED DESCRIPTION

Figure 1:
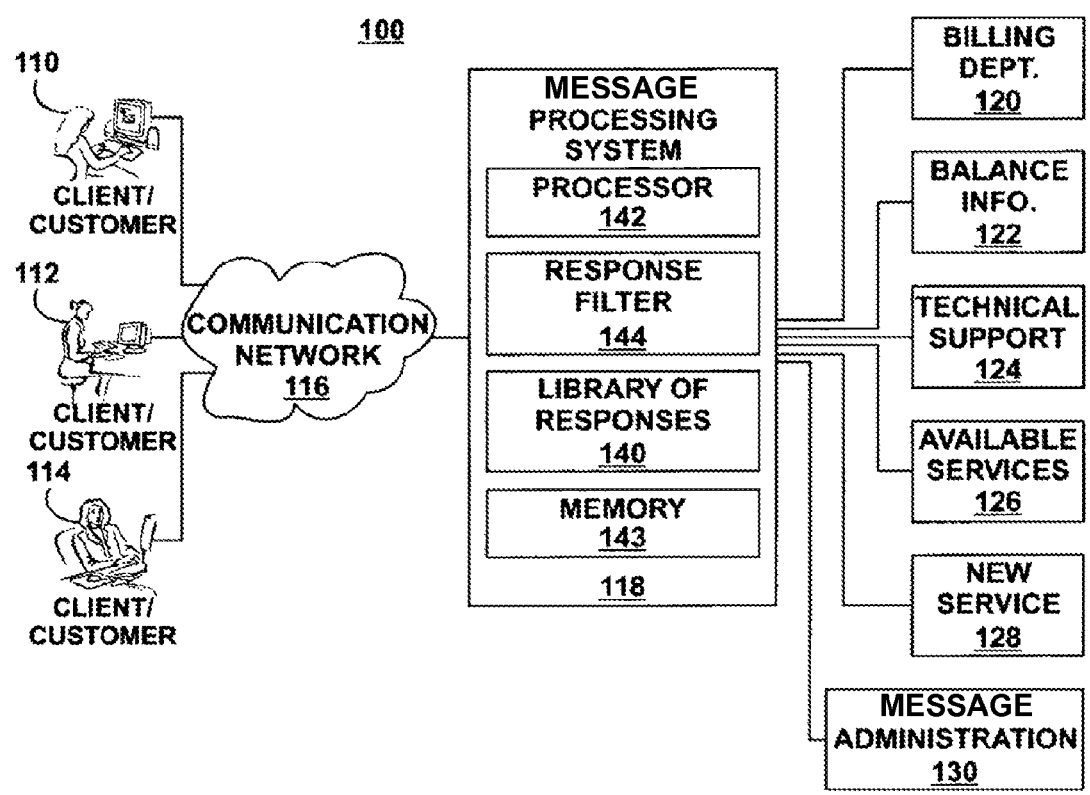
FIG. 1 illustrates a simplified configuration of an e-mail system incorporating teachings of the present disclosure.

In a particular embodiment, a method includes receiving, at a message processing system that includes a processor and a memory, a message from an originator. The message includes content related to a particular service of a plurality of services. The method includes selecting a set of potential responses to the message at the message processing system based on the particular service. The method also includes retrieving account information related to the originator of the message at the message processing system. The method further includes filtering the set of potential responses at the message processing system to provide a filtered set of responses. The set of potential responses is filtered based on the account information. When a first response of the filtered set of responses has a confidence level that exceeds a threshold confidence level, the method includes sending the first response from the message processing system to the originator of the message without sending the filtered set of responses to an agent.

In another particular embodiment, a non-transitory tangible memory includes instructions that, when executed by a processor, cause the processor to receive a message from an originator via a communications network. The message includes content related to a particular service of a plurality of services. The instructions are further executable by the processor to determine a routing destination for the message based on the particular service included in the content of the message. The instructions are further executable by the processor to retrieve a list of possible responses to the message based on the routing destination and to retrieve account information related to the originator of the message. The instructions are further executable by the processor to determine whether the originator of the message subscribes to the particular service based on the account information. The instructions are further executable by the processor to filter the list of possible responses based on whether the originator of the message subscribes to the particular service. The instructions are further executable by the processor to assign a relevancy score to each possible response of the filtered list of possible responses. The instructions are further executable by the processor to send a response from the filtered list of possible responses to the originator of the message when the relevancy score associated with the response exceeds a threshold relevancy level.

In another particular embodiment, a system includes a server that includes a memory and a processor. The memory includes instructions that are executable by the processor to receive a message from an originator. The message includes content related to a particular service of a plurality of services. The instructions are further executable by the processor to select a set of potential responses to the message based on the particular service. The instructions are further executable by the processor to retrieve account information related to the originator of the message. The instructions are further executable by the processor to filter the set of potential responses based on the account information. When the response has a confidence level that exceeds a threshold confidence level, the instructions are further executable by the processor to send a response from the server to the originator of the message without sending the filtered set of potential responses to the agent.

Referring to FIG. 1, a system for processing client-originated e-mail is depicted and generally designated 100. As depicted, system 100 includes, client interfaces 110, 112 and 114, a communication network 116, a message processing system 118, and destinations for a given client message. In FIG. 1, the destinations include a billing department 120, a balance information department 122, a technical support department 124, an available services department 126, a new service department 128, and a message administrator department 130. Each department 120-130 may be capable of providing answers to client/customer-originated inquiries.

In a particular embodiment, one or more of the departments 120-130 may be specialized such that one department may be more efficient than another department in handling messages having specific or specialized subject matter. Messages not intended for a specific department or having unintelligible subject matter may be routed to the message administrator department 130, for example, where "manual" routing of the message can be performed.

An illustrative embodiment of a message processing system 118 may be a message server for processing and routing messages. The message server may automatically route messages to an appropriate department based on recognition of subject matter of the message, a type of form submitted, or based on entries entered into a form, which may, for example, be provided by the customer, a department, a service center, and/or some other entity or device capable of populating some portion of a form.

The message server may be accessible to a plurality of terminals that are monitored by agents, illustrated as departments 120-130. The communication network 116 may include portions of a plain old telephone service (POTS) system, a public network (e.g. the Internet), a wireless network, or any system that can transport, convey, or route messages. Additionally, while only a single message administrator 130 is illustrated, it should be understood that a plurality of message administrators may be coupled to the message processing system 118 and the plurality of message administrators may be organized based on a type of message processed by each message administrator. For example, one set of message administrators may respond to emails while another set of message administrators may respond to instant messages. In addition to the illustrated departments 120-130, additional departments or a variety of departments may be utilized to service incoming messages. More than one type of message may be received by the message processing system 118. For example, the message received from the customer may be an Instant Message (IM) or a voice message received via an interactive voice response (IVR) system. In a particular embodiment, the messages handled by the message processing system 118 may have "attachments," embodying standardized forms or questionnaires. The message may also have faxes, audio files, or voice message attached that are routed to departments 120-130.

The message processing system 118 may include a processor 142, a library of responses 140, a response filter 144, and a memory 143. When a client or customer 110-114 sends a message request to a message service center, the message processing system 118 may receive the message via communication network 116 and may classify the message. Classification may involve making a determination about routing destination, such as destination 120-130 for the message, and/or some other decision. In one configuration, when a destination service department is not automatically determined by the message processing system 118, the message may be sent to the administration department 130. Department 130 may review the message and delegate message response duties. In some embodiments, an agent at the administration department 130 may review a message using a graphical user interface with selectable forwarding locations (i.e., service departments) and select a department and forward the customer request.

However when a routing destination is determined, the message processing system 118 may formulate a list of potential responses to the message utilizing the library of responses 140. In some cases, the list may be limited to responses that are relevant to the department selected to handle the email. In other words, a subset of the library of responses 140 specific to the selected department can be retrieved by the processor 142. A relevance variable may also be assigned to individual responses based on recognition of the subject matter or content of the message.

In a particular embodiment, the list of responses may be arranged utilizing the relevancy percentage to form a hierarchy. A solution incorporating teachings of the present disclosure may also make use of information outside the received email and the library of responses. For example, the identity of the client (the originator of the message) and the client's account information may be utilized to gather data or information about the client that is extrinsic to the subject matter or content of the message. In a particular configuration, extrinsic client information may be obtained by accessing the client's account in the memory 143 (or retrieving the information from external memory), and performing data analysis.

An email processing system, such as the message processing system 118, may include features in addition to the features described above. For example, when the message processing system 118 favors a given response and when the given response enjoys a high confidence level (i.e., the system is confident that it understands a customer message and that the response is proper), the message processing system 118 can provide an automated response to the message (a response requiring no human intervention). When a confidence level is average to low, the message can be routed to an appropriate department based on the subject matter of the message and a filtered list of possible responses can be provided to an agent at the receiving department.

In one example, a customer or client message may request Digital Subscriber Line (DSL) services. After receipt of such a message, the request may be routed to the new services department 128 by the processor 142 operating on instruction retrieved from memory 143. The library of available responses 140 may be initially filtered to create a list of responses specific to new services department 128 and DSL services. In addition, extrinsic customer data may be acquired and a secondary response filter may utilize the extrinsic data to filter or remove inappropriate responses. The extrinsic data may also be used to lower the relevancy of particular responses in the list. Thus, an initially filtered list—based on new service request and DSL—may include the responses below:

"We would be happy to install DSL services but we need some additional information;" and "We are sorry but DSL services are not available at this time in your area."

As indicated above, this list of potential responses may be further modified using additional information, which may be extrinsic to the initial request. For example, processor 142 may retrieve additional information about a client such as the client's physical location and determine that DSL is not available at the client's location. Thus, when the response filter 144 is applied utilizing the additional information; the response, "We would be happy to install DSL services, but we need some additional information," could be deleted from the list and/or assigned a lower relevancy score.

Figure 2:
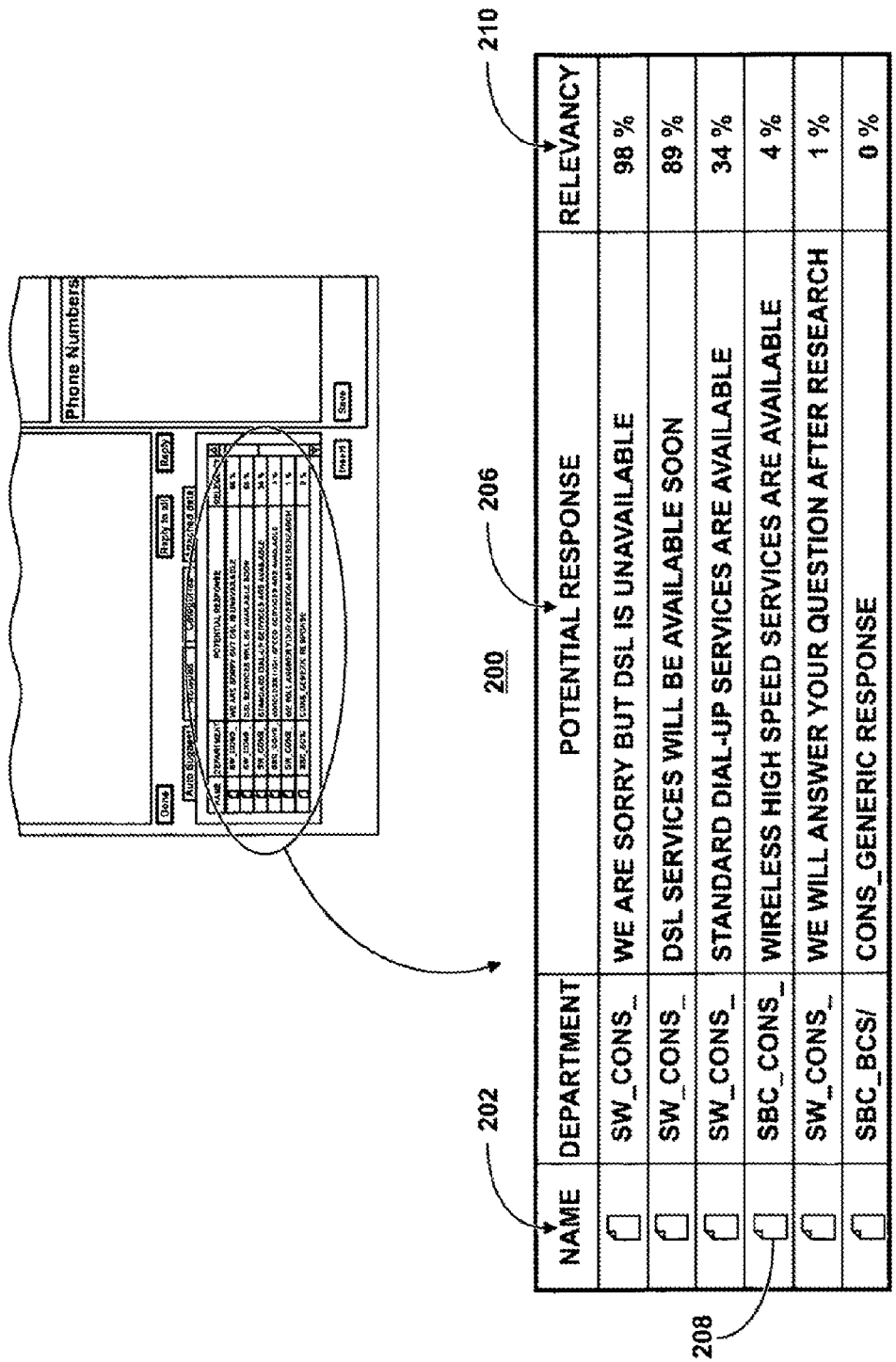
FIG. 2 depicts a graphical user interface with selectable responses.

Referring to FIG. 2, a graphical user interface 200 having selectable responses for agent review is illustrated. The heading of the graphical user interface 200 can include Name 202 (the name of the originator of the message), Potential Responses 206 and a Relevancy score 210 (of the potential response). In the depicted embodiment, additional information available to the agent may be retrieved using the graphical user interface 200 by selecting "virtual buttons" on the screen display. For example, selection of a customer file such as name 208 can display information about the customer's account if an agent desires to review additional information about the customer prior to responding to the message. The agent at the department may review the message and "point-and-click" to select entries in the response list generated by the message processing system for transmission to the originator. The relevancy percentage or confidence level generated by the message processing system may also aid the agent in response selection. One example of filtering responses based on information extrinsic to the subject matter of the message is provided above; however, hundreds of filtering rules could be utilized to provide an efficient system.

Figure 3:
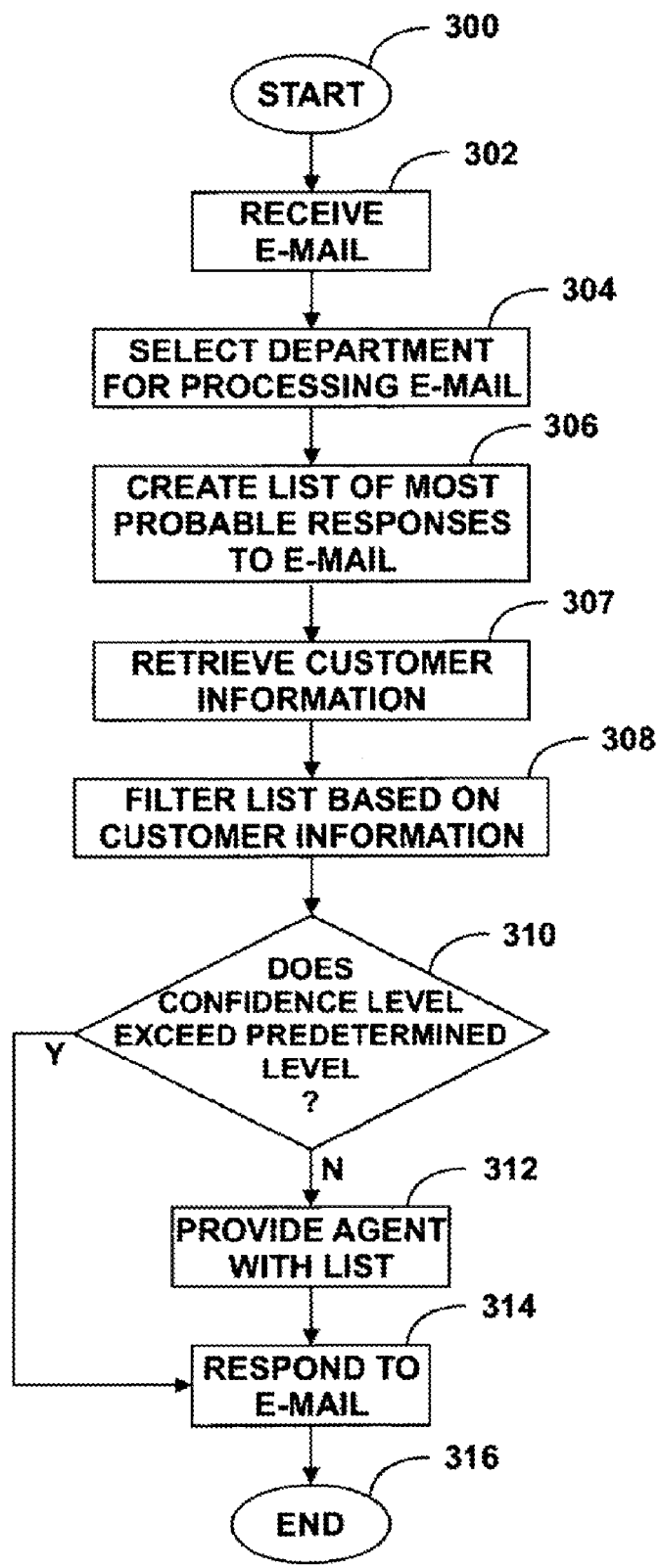
FIG. 3 is a flow diagram that illustrates a method of processing e-mails in accordance with teachings disclosed herein.

FIG. 3 presents a flow diagram that illustrates a method of processing messages in accordance with teachings disclosed herein. The method may be performed by the message processing system 118 of FIG. 1. The method starts at 300 and proceeds to step 302 where a message, such as an e-mail, is received from a customer. A department for processing the e-mail may be selected at step 304 based on the content and/or the subject matter of the e-mail. The e-mail may be routed to a department or an agent selected at step 304 to further analyze the message and/or to provide an acceptable response.

A list of possible responses to the received e-mail may be created at step 306 based, for example, on one or more of the selected routing options and the content of the e-mail. Information extrinsic to the e-mail such as customer information, including physical address and billing information may be retrieved at step 307, and a list of possible responses can be filtered based on the extrinsic customer information. At step 308, the filter can be employed to delete list entries or to organize the list based on the perceived relevancy of the probable responses. For example, the region where the customer lives, currently purchased services, available services, payment history, and the local services provider may be utilized to determine whether a response is likely or even appropriate.

As illustrated at decision step 310, if the relevancy of a proposed response exceeds a predetermined level, the system may automatically respond to the e-mail, as shown when the process moves to step 314. Alternately and/or in other embodiments, when the relevance does not exceed a predetermined threshold, the original e-mail and the list of probable responses may be delivered to an agent in the department selected in step 304 as is illustrated at step 312. The agent may then respond to the e-mail as is illustrated by step 314. The process may end at step 316 and/or proceed through additional steps to help ensure that the customer request was properly handled. An e-mail response system incorporating the teachings disclosed herein may improve the accuracy and the speed at which an agent can answer an e-mail. Speed of response alone may increase by an appreciable amount (e.g., 20%). This increased efficiency may allow a given agent to respond to additional e-mails (as much as 18,000 or more e-mails per month) at an improved level of accuracy.

The above-disclosed subject matter is to be considered illustrative, and not restrictive, and the appended claims are intended to cover all such modifications, enhancements, and other embodiments that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, at a message processing system comprising a processor and a memory, a message from an originator, wherein the message identifies a particular service of a plurality of services;
   selecting a set of potential responses to the message at the message processing system based on the particular service identified in the message;
   retrieving account information related to the originator of the message at the message processing system, the account information identifying subscribed services associated with the originator of the message;
   determining whether the originator of the message subscribes to the particular service identified in the message based on the account information;
   filtering the set of potential responses at the message processing system to provide a filtered set of responses, wherein the set of potential responses is filtered based on whether the originator of the message subscribes to the particular service identified in the message; and
   when a first response of the filtered set of responses has a confidence level that exceeds a threshold confidence level, sending the first response from the message processing system to the originator of the message without sending the filtered set of responses to an agent.

2. The method of claim 1, further comprising assigning the message and the filtered set of responses to the agent when none of the responses in the filtered set of responses has a confidence level that exceeds the threshold confidence level.

3. The method of claim 1, wherein the message is at least one of an e-mail message, an instant message, and a voice message.

4. The method of claim 3, wherein the agent is determined based on the particular service and wherein the agent is one of an e-mail agent, and instant message agent, and a voice message agent.

5. The method of claim 4, wherein the particular service includes a digital subscriber line service.

6. The method of claim 4, wherein the particular service includes a wireless service.

7. The method of claim 2, further comprising:
   ordering the filtered set of responses based on particular criteria; and
   providing the filtered set of responses to the agent in order of the particular criteria.

8. The method of claim 7, wherein the particular criteria is the confidence level and wherein the filtered set of responses is ordered based on the confidence level.

9. The method of claim 2, wherein the message includes at least one of an attached fax, an attached audio file, and an attached voice message that is routed to the agent along with the message.

10. The method of claim 2, further comprising initiating presentation of at least a portion of the filtered set of responses within a graphical user interface configured to enable the agent to select a response from the filtered set of responses.

11. The method of claim 1, further comprising filtering the set of potential responses at least in part based on payment history information, wherein the payment history information is included in the account information related to the originator of the message.

12. The method of claim 1, wherein the account information related to the originator of the message includes a physical address associated with the originator of the message and wherein the set of potential responses is filtered based on whether the particular service is available at the physical address.

13. The method of claim 2, further comprising initiating presentation of at least a portion of the filtered set of responses within a graphical user interface that is configured to allow the agent to review the message and to forward the message to another agent.

14. The method of claim 1, wherein the message includes an attached form, and wherein the message processing system automatically determines that the message identifies the particular service based on an entry in the attached form.

15. The method of claim 1, wherein the subscribed services associated with the originator of the message are identified by one or more purchased services of the plurality of services.

16. A non-transitory tangible memory comprising instructions that, when executed by a processor, cause the processor to:
   receive a message from an originator via a communications network, wherein the message identifies a particular service of a plurality of services;
   determine a routing destination for the message based on the particular service identified in the message;
   retrieve a list of possible responses to the message based on the routing destination;
   retrieve account information related to the originator of the message, the account information identifying subscribed services associated with the originator of the message;
   determine whether the originator of the message subscribes to the particular service identified in the message based on the account information;

filter the list of possible responses based on whether the originator of the message subscribes to the particular service identified in the message;

assign a relevancy score to each possible response of the filtered list of possible responses; and send a response from the filtered list of possible responses to the originator of the message when the relevancy score associated with the response exceeds a threshold relevancy level.

17. The non-transitory tangible memory of claim 16, wherein when none of the responses of the filtered list of possible responses exceeds the threshold relevancy level, the instructions are further executable by the processor to:

sort the filtered list of possible responses based on the assigned relevancy scores to produce a relevancy ordered list of responses; and initiate display of the relevancy ordered list of responses at an agent terminal.

18. The non-transitory tangible memory of claim 16, wherein the particular service includes one of a digital subscriber line service and a wireless service.

19. A system, comprising:

a server comprising a memory and a processor, the memory including instructions that are executable by the processor to receive a message from an originator, the message identifying a particular service of a plurality of services, to select a set of potential responses to the message based on the particular service identified in the message, to retrieve account information related to the originator of the message, the account information identifying subscribed services associated with the originator of the message, to determine whether the originator of the message subscribes to the particular service identified in the message based on the account information, to filter the set of potential responses based on whether the originator of the message subscribes to the particular service identified in the message, and to send a response from the server to the originator of the message without sending the filtered set of potential responses to an agent when the response has a confidence level that exceeds a threshold confidence level.

20. The system of claim 19, wherein the server is further operable to assign the message and the filtered set of potential responses to the agent when none of the responses has a confidence level that exceeds the threshold confidence level.

* * * * *